(12) United States Patent  
Booth

(10) Patent No.: US 8,298,644 B2  
(45) Date of Patent: Oct. 30, 2012

(54) FLOOR MAT

(75) Inventor: Daniel W. Booth, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 12/698,195

(22) Filed: Feb. 2, 2010

(65) Prior Publication Data

US 2011/0189425 A1   Aug. 4, 2011

(51) Int. Cl.  
*B32B 3/02* (2006.01)

(52) U.S. Cl. .............. 428/74; 428/68; 428/95

(58) Field of Classification Search ............ 428/74, 428/95, 68  
See application file for complete search history.

(56) References Cited

U.S. PATENT DOCUMENTS

2004/0261208 A1* 12/2004 McKay ............... 15/215  
2007/0077845 A1* 4/2007 Cheskis ............. 442/389

* cited by examiner

*Primary Examiner* — Brent O'Hern  
(74) *Attorney, Agent, or Firm* — Quinn Law Group, PLLC

(57) ABSTRACT

A mat assembly configured for use with a vehicle includes a mat holder and a mat insert. The mat insert is permeable to contaminants and is made of a spacer fabric which may be a 3D knit fabric. The mat holder is configured to entrap contaminants permeating the mat insert. The mat insert and mat holder are configured such that the mat insert can be detached from and reattached to the mat holder for cleaning. The mat insert has at least one appearance layer which may be a carpet-like material. The mat holder may include a panel, which may be hingedly attached to or detachable from the mat holder, through which entrapped contaminants may be removed. The mat holder may be integral to the vehicle, e.g., an aperture in the floor covering, a liner or an insert, or a cavity in the floor, trunk or cargo area of the vehicle.

17 Claims, 3 Drawing Sheets

FLOOR MAT

TECHNICAL FIELD

The present invention relates to an automotive vehicle floor mat configured to hide dirt and from which the dirt may be readily removed and the mat easily cleaned.

BACKGROUND OF THE INVENTION

Automotive floor mats are typically made of elastomeric, rubber based or carpet-like material or a combination thereof, and are used to protect the underlying floor surface of an automobile from dirt, contaminants or moisture introduced by a user or the user's footwear, for example, by a driver or passenger or the footwear of an occupant of the vehicle. Similarly constructed floor mats may be used to protect the floor surface of other vehicles, including boats, sports utility vehicles and trucks, or other surfaces within vehicles which may be subject to exposure to dirt, contaminants and moisture, such as truck bed surfaces, vehicle trunk interiors and similar applications.

A disadvantage of such mats is their limited capability to absorb dirt and moisture, including water from melting ice or snow introduced from a user's shoes during inclement weather, such that after a period of use the mat will become dirty and unsightly. Further, when their capacity to absorb dirt and/or moisture is exceeded, excessive dirt and/or moisture may migrate to areas around and under the mat, resulting in the floor area surrounding the mat to become dirty, stained or unsightly, thereby defeating the protective purpose of the mat. A further disadvantage of such mats is the inconvenience of cleaning the mat using conventional methods including vacuum cleaners, upholstery cleaners, etc. which requires bringing equipment and other materials, such as a vacuum cleaner, cleaning materials, etc. to the vehicle, and/or removing the mat from the vehicle for cleaning during which time the underlying surface may be unprotected.

SUMMARY OF THE INVENTION

A floor mat assembly with improved capabilities to absorb and hide dirt, water and other contaminants, which is configured to be easy to clean, is provided herein. The floor mat assembly includes a mat holder and a mat insert. The mat insert is made at least partially of a spacer fabric which is configured to include a spacer layer and may include one or more facing layers, where each layer is configured to be permeable to contaminants, e.g., dirt, water, other fluids and particulate matter, which may contact the surface of the mat insert. The contaminants will substantially migrate through the spaces in the spacer fabric, and therefore will be hidden from the surface of the mat, resulting in a substantially clean mat surface. After permeating through the mat insert, the contaminants may be entrapped by a mat holder removably attached to the mat insert, until the mat assembly is cleaned and the entrapped contaminants removed.

The spacer fabric includes a spacer layer which may include a rigid or semi-rigid structure such as a honeycombed or webbed structure, or may be a woven or knitted structure, such as the connecting layer of a 3D distance knit fabric or a 3D spacer fabric. The facing layer or layers may be configured as a woven or knitted structure, or may be grid-like, cellular, matrixed or of another configuration so as to be permeable to contaminants which may contact the facing layer.

In a preferred embodiment, the mat insert is at least partially configured from spacer fabric which is 3D knit fabric, also known as 3D distance knit fabric, 3D spacer fabric or 3D spacer knit fabric. The 3D knit fabric of the mat insert includes a first facing layer, a second facing layer and a connecting layer. The connecting layer may be knitted of a monofilament material or yarn which may be made from, for example, polyether sulfone (PES), polyamide (PA), or other suitable polymeric materials. The facing layers may typically be configured as woven or knitted layers, although other configurations may be used. The first facing layer, the second facing layer or both facing layers of the mat insert may be an appearance layer or may be fabricated to include an appearance layer. The appearance layer is generally outwardly facing, e.g., visible to the user, when the mat insert is attached to the mat holder and the mat assembly is positioned for use in an application. The appearance layer may be a carpet-like material, a meshed or grid-like material, or other material as is suitable for a floor mat application and permeable to contaminants. When a first facing layer and a second facing layer are both appearance layers, the mat insert may be configurable to be reversible, e.g., the mat insert may be operatively attached to the holder such that either side may be the outwardly facing side, according to user preference or as best suited to usage conditions or environment.

The mat insert and the mat holder are configured such that the mat insert can be operatively attached to the mat holder in a manner such that the mat insert may be detached from and reattached to the mat holder. The mat holder may include an attaching feature by which the mat holder is attached to a corresponding feature of the mat insert, whereby the attaching feature of the mat holder is in contact with the corresponding feature of the mat insert. For example, the attaching feature of the mat holder may be a slot, groove or channel within one or more sides or the mat holder, and the corresponding feature of the mat insert may be one or more edges of the mat insert, which may be reinforced by joining, knitting, sewing, seaming, fusing, crimping, bonding or binding together the edges of the layers of the 3D knit material to form a edge which is insertable and will be retained within the slot, groove or channel of the mat holder. A portion or the entire perimeter of the mat insert may be finished by joining, knitting, sewing, seaming, fusing, crimping, bonding or binding together the edges of the layers of the 3D knit material to form a finished edge for the mat, to enhance the appearance of the mat, for structural support, to provide an attaching feature, or for a combination of these reasons.

The mat holder may be configured to entrap contaminants which permeate through the mat insert, and may include one or more recesses or recessed areas to collect the contaminants which have been entrapped by the mat holder. The mat holder may also include an opening, which may be covered by a panel, flap or door through which entrapped contaminants may be removed from the mat assembly. The panel may be hingedly attached to the mat holder, or the panel may be fully detachable from the mat holder. The pane and opening may be of any size and configuration sufficient to enable efficient removal of entrapped contaminants from the mat assembly. The mat holder may also be sloped or include a slope or channels to direct the contaminants to one or more collection points, including the recessed areas, or the opening or panel. Further, the entrapped contaminants may be removed from the mat assembly by at least one of dumping, draining, evacuating or vacuuming the contaminants from the mat assembly, after either removing the mat insert, opening the panel, or both removing the mat insert and opening the panel.

When used in a vehicle application, for example, in an automobile, sports utility vehicle, truck, golf or utility cart, boat, etc., the mat holder may be defined by an element of the vehicle. For example, the mat holder may be an aperture in a covering, such as the vehicle's carpeting, a liner or an insert for a floor, trunk, cargo area or bed of the vehicle, where the aperture may be configured to include one or more attaching features, such as a groove or slot in the face of the aperture, attaching clips, a ridge or ledge upon which the insert may rest, etc. Alternatively, the mat holder may be defined by a cavity or recessed area in the floor, trunk, cargo area and a bed of the vehicle, or a combination of an aperture and a cavity. The surface underlying the mat insert may include additional recesses or cavities, for example, channels or ridges, and/or be sloped or include sloped surfaces to collect the contaminants which have permeated the mat insert. The underlying surface may be further configured such that the entrapped contaminants may be removed from the cavity or cavities, or other recesses by draining, evacuating or vacuuming the contaminants.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
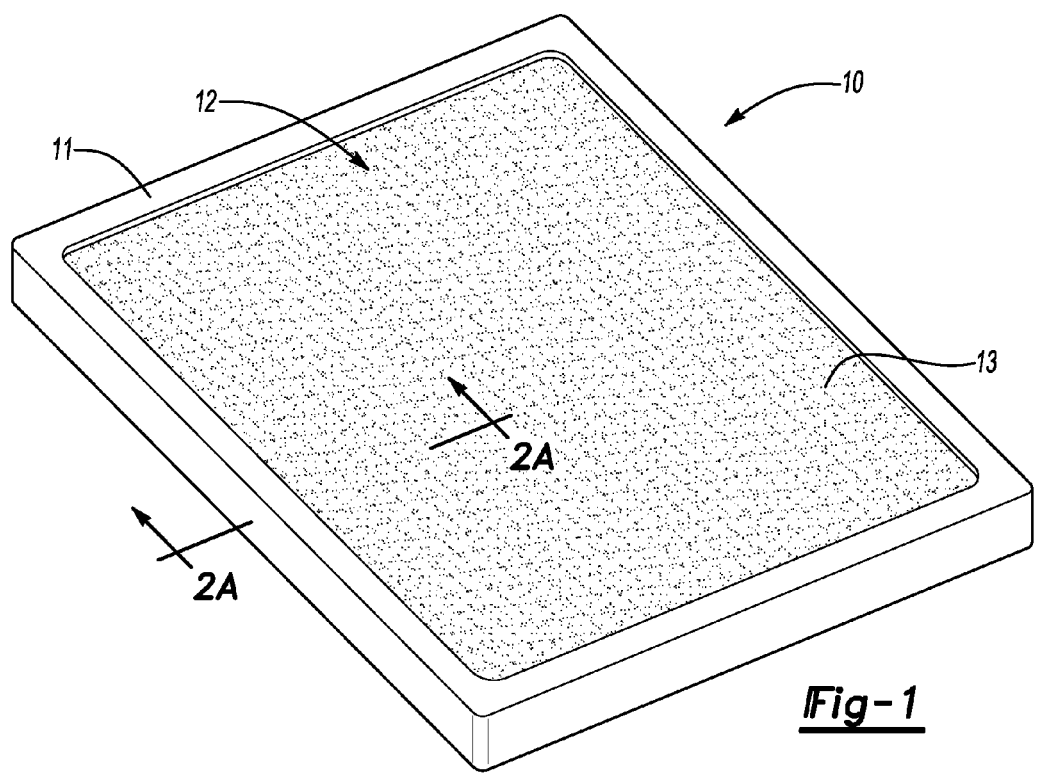
FIG. 1 is a schematic perspective view of a mat assembly.

With reference to the drawings, wherein like reference numbers refer to the same or similar components throughout the several views, and beginning with FIG. 1, a mat assembly is generally indicated at 10. The mat assembly is of the type which may be used in a vehicle, for example, in an automobile, sports utility vehicle, truck, golf or utility cart, boat, etc. Mat assembly 10 may also be used as a floor mat in a non-vehicle application, for example, as a door mat, factory mat, etc. within the scope of the claimed invention. As described in detail herein, mat assembly 10 is generally configured to absorb and hide dirt, water and other contaminants (not shown), including fluids and particulate material, and is configured to be easy to clean, e.g., to remove the contaminants from the mat assembly 10.

As shown in FIG. 1, floor mat assembly 10 includes a mat holder 11 and a mat insert 12. The mat holder 11 is typically made of an elastomeric, polymeric, plastic, neoprene or rubber-based material and may be configured to surround the perimeter and non-visible (inward or downward) side of the mat insert 12. The mat holder 11 is configured to be of sufficient thickness to provide support and structural stability to mat insert 12, and may be molded or shaped to conform to the surface underlying the mat assembly. For example, the mat holder 11 may be molded or shaped to fit on, be matable with, or be conforming to the floor of the driver or passenger foot area of a vehicle, where mat holder 11 may be sloped or curved to conform with the shape of the vehicle floor or floor pan, and where mat holder 11 may be shaped to fit around and provide clearance for the vehicle's accelerator and brake pedals.

Mat insert 12 is configured to fit within and be operatively attached to mat holder 11. For purposes of illustration, mat assembly 10, mat holder 11 and mat insert 12 are each shown as generally rectangular in shape in FIG. 1. However, mat holder 11 and mat insert 12 may be of any shape or configured as is suitable to the application, e.g., as discussed earlier, mat assembly 10 may be shaped to conform to the foot well of a vehicle and may be non-symmetrically and irregularly shaped to provide clearance for the vehicle's pedals. Mat holder 11 and mat insert 12 may be decoratively shaped as suitable to the function within the scope of the claimed invention. Mat assembly 10 may be configured as a mat holder 11 that may include more than one mat insert 12 (not shown), wherein the inserts 12 may be of different sizes and shapes and may be made from different materials, including different 3D knit fabrics, and different appearance layers, within the scope of the claimed invention.

Mat insert 12 is made at least partially of spacer fabric comprised of materials which are configured to be permeable to contaminants (not shown) which may contact the surface 13 of mat insert 12 during use. These contaminants may include dirt, water, other fluids and particulate matter which may, for example, be of the type to adhere to the shoes of a vehicle driver or passenger and fall off or become disengaged from the shoes of a vehicle driver or passenger when the vehicle occupant's shoes contact the mat insert 12. The contaminants may include fluids and substances which may be spilled or dropped by a vehicle occupant onto the surface 13 of mat insert 12, which may be of the type or size to permeate the holes or openings in the fabric of mat insert 12. The layered spacer fabric included in mat insert 12, which may be a knitted 3D distance fabric or a 3D knit material, is fabricated so that the holes or openings in each layer of the spacer fabric will stretch larger or smaller depending on the forces placed upon them. As mat insert 12 and its included fabric layers are subject to contact by the shoes of a user, who may be an occupant of the vehicle, dirt and/or fluids will fall off the shoes of the user and land on the surface layer 13 and then will substantially migrate through the open spaces in the layers of the spacer fabric, e.g., through the weave of each layer of the 3D knit fabric. As the contaminants migrate through the permeable structure of mat insert 12, the contaminants become entrapped in mat holder 11. The migration of contaminants through the permeable structure may be assisted by forces such as contact by the user's shoes on the mat insert surface 13, gravity, or the vibration of mat insert 12 by vehicle motion. In this manner, contaminants will be removed and hidden from surface layer 13 and entrapped in mat holder 11, allowing mat insert 12 to retain a substantially clean and uncontaminated appearance.

The layered material of mat insert 12 may be configured as a 3D knitted distance fabric, also know as a 3D knit spacer material, where the spacer layer of mat insert 12 is provided by the connecting layer of the 3D knitted fabric. Alternatively, the layered material of mat insert 12 may include a rigid or semi-rigid permeable layer configured to include, for example, a honeycombed, webbed, celled, grid-like or matrixed structure which is permeable to contaminants. As an additional advantage, the spacer fabric, e.g., the 3D knit fabric of mat insert 12 may provide a cushioning layer in the floor mat assembly 10 with good bending performance for repeated removal from and reinsertion of mat insert 12 into mat holder 11. The spacer fabric or 3D knit fabric of mat insert 12 may also provide improved compression and elasticity which may contribute to increased durability. The air permeability and breathability characteristics of the spacer fabric may reduce the drying time of wet floor mats and may also reduce the propensity for mold, mildew and/or odor development in the mat assembly 10 over extended time in use.

As contaminants accumulate in mat assembly 10, it may become necessary to clean the mat assembly 10 by removing the accumulated contaminants. This may be accomplished by detaching and removing the mat insert 12 from the holder 11 and then cleaning the accumulated contaminants from mat holder 11 and if required, from the mat insert 12, using any cleaning technique which is suitable, including dumping, draining, evacuating, vacuuming or brushing the contaminants from holder 11 and insert 12.

Figure 2A:
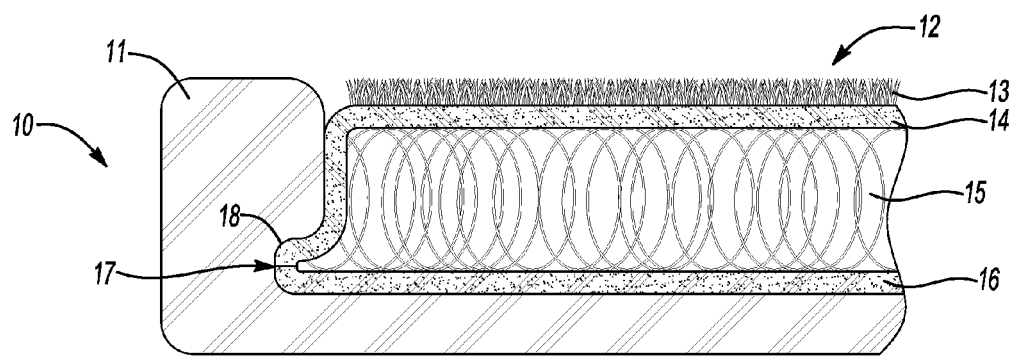
FIG. 2A is a partially cross-sectioned view of section 2A of the mat assembly of FIG. 1.

Referring to FIG. 2A, shown is a partially cross-sectioned view of section 2A of the mat assembly 10 of FIG. 1. Mat insert 12 is shown in additional detail to be configured as a layered structure, which may include a spacer fabric such as a 3D knit fabric. In the embodiment shown in FIG. 2A, the mat insert 12 includes a first facing layer 16, a second facing layer 14 and a spacer or connecting layer 15. The layers may be attached to each other by weaving, knitting, fusing, sewing, crimping, bonding or similar means, to provide a layered fabric with a structure permeable to contaminants. The spacer layer 15 may be configured of an open cell, honeycombed, gridded, knitted, woven, webbed or netted material. In the embodiment shown in FIG. 2A, mat insert 12 includes a 3D knit material, where spacer layer 15 is the connecting layer 15 of the 3D knit fabric, and may be formed or knitted from a monofilament material or yarn which may be made of, for example, polyether sulfone (PES), polyamide (PA), polyester or other polymeric materials, or of other materials or combination of materials known to those skilled in the art of 3D knit fabrics which would provide the material properties required to form the mat insert's permeable configuration.

The first facing layer 16 may be knitted, woven or formed in a woven, netted, meshed or grid like pattern, where the open spaces in the weave of layer 16 are sufficiently large to allow contaminants which have permeated mat insert 12 to pass through layer 16 and become entrapped within mat holder 11. Second facing layer 14 may also be knitted, woven or formed in a woven, netted, meshed or grid like pattern, which may be the same or different from the configuration or pattern of layer 14, again with open spaces in the weave, pattern or configuration of layer 14 which are sufficiently large to allow contaminants which are introduced to the surface of mat insert 12 to permeate layer 14 so as to be hidden from the surface of mat insert 12. The weave or pattern selected for each layer 14, 15, 16 may be selected to provide for progressively increasing permeability from the outwardly facing layer to the downwardly facing layer (shown as layer 16 in FIG. 2A), such that the functional result would be a tendency for contaminates to migrate preferentially toward mat holder 11, assisted by gravity, vibration and other forces, and to exit through the downwardly facing layer to be entrapped by mat holder 11.

The first facing layer 16, second facing layer 14 or both facing layers 16, 14 may each be an appearance layer so as to be reversible, or may be fabricated to include an appearance layer, such as layer 13, which is represented in FIG. 2A as a carpet-like or tufted material layer included in second surface layer 14. An appearance layer is generally understood to be a layer which may be the outwardly facing layer, e.g., a layer which may be visible to the user when the mat insert is attached to the mat holder, and which may typically be configured to be aesthetically acceptable to the user, for example, of a matching or coordinating color and texture to other appearance surfaces in the vehicle. As shown for layer 13 in FIG. 2A, the appearance layer may be a carpet-like material, to enhance the appearance of the vehicle, and to additionally provide a surface that is minimally abrasive to the heel material of a driver's shoe when in the driver's heel contacts the floor mat during pedal maneuvers. Alternatively, the appearance layer may be a meshed or grid-like material, or other surface configuration that would be suitable for a floor mat application, permeable to contaminants and aesthetically or functionally acceptable. When first facing layer 16 and second facing layer 14 are both either an appearance layer or include an appearance layer, the mat insert may also be configured to be reversible, e.g., the mat insert may be operatively attached to the holder such that either side may be the outwardly facing side, according to user preference or as best suited to usage conditions or environment.

Not shown, but as would be understood by those skilled in the art, mat insert 12 may also be configured to include a spacer layer 15 and only one facing layer 16, where the spacer layer 15 may also be an appearance layer. The facing layers and spacer layer may be connected to each other by knitting, weaving, fusing, adhesing or interlocking one layer to another, or by other methods known to those skilled in the art.

Referring again to FIG. 2A, mat insert 12 and mat holder 11 are configured such that mat insert 12 can be operatively attached to mat holder 11 in a manner such that mat insert 12 may be detached from and reattached to mat holder 11. Mat holder 11 may include an attaching feature by which mat holder 11 is attached to a corresponding feature of mat insert 12, whereby the attaching feature of mat holder 11 is in contact with the corresponding feature of mat insert 12. For example, the attaching feature of mat holder 11 may be a slot, groove or channel 18 provided within one or more sides of mat holder 11, and the corresponding feature of mat insert 12 may be one or more edges 17 of mat insert 12, where the edge 17 may be reinforced by joining, knitting, sewing, seaming, fusing, crimping, bonding or binding together edges 17 of layers 14, 15, 16 to form a edge 17 which may be insertable in and may be retained or attached within a corresponding slot, groove or channel 18 of mat holder 11. A portion or the entire perimeter of mat insert 12 may be finished by joining, knitting, sewing, seaming, fusing, crimping, bonding or binding together the edges 17 of layers 14, 15, 16 to form a finished edge 17 for mat insert 12, to enhance the appearance of mat insert 12, for structural support, to provide an attaching feature, or for a combination of these reasons.

Mat holder 11 may include a slot or groove 18 which extends around the entire interior perimeter of the mat holder, such that the outside edge 17 of mat insert 12 is inserted into the groove 18 around the entire perimeter of mat insert 12. Alternatively, mat holder 11 may include features such as one or more slots or grooves 18 which extend along one or more interior sides of mat holder 11, or along one or more portions of the interior perimeter of mat holder 11, where corresponding edges 17 or mat insert 12 are inserted into corresponding grooves 18 so as to retain, insert or attach the mat insert 12 in the mat holder 11.

Mat insert 12 may be removed from mat holder 11 by bending the side of mat holder 11 away from an upright position so that the edge 17 of the mat insert 12 is released from the groove 18 and mat insert 12 can be readily removed for cleaning and to dispose of contaminants which may be entrapped under mat insert 12 by mat holder 11. Alternatively, tabs, loops, straps or other attachments may be added to mat insert 12 to assist in detaching mat insert 12 from mat holder 11. Although the embodiment shown in FIG. 2A shows a groove and inserted edge configuration, it would be understood by one skilled in the art that many different types of configurations could be utilized to detachably attach mat insert 12 to mat holder 11.

As shown in FIG. 2A, mat holder 11 may be configured to entrap contaminants permeating mat insert 12 between insert 12 and the interior surface of holder 11. Mat holder 11 may be configured, preferably, of an elastomeric, polymeric, plastic, neoprene or rubber like material so as to be impermeable to water and other fluids, such that mat holder 11 may entrap these fluids to protect the surface underlying the mat holder 11, typically the vehicle carpeting or a floor surface.

Figure 2B:
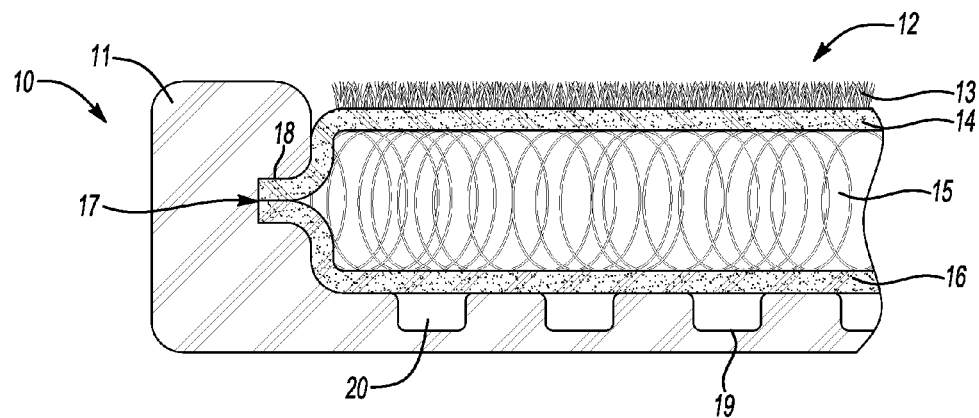
FIG. 2B is a partially cross-sectioned view of section 2A of the mat assembly of FIG. 1 illustrating an alternative construction.

Referring to FIG. 2B, shown is a mat holder 11 which further includes one or more recesses or recessed areas 20 to collect the contaminants which have been entrapped by the mat holder 11. The recesses 20 may be of any suitable configuration to collect the entrapped contaminants, for example, the recesses 20 shown in FIG. 2B are defined by channels or grooves 19 formed lengthwise into the interior surface of mat holder 11. The recesses 20 effectively increase the capacity of mat holder 11 to entrap contaminants which permeate through mat insert 12 and also effectively increase the capacity of mat holder 11 to entrap fluids to prevent spillage or leakage from the mat assembly 10 onto the vehicle floor surface surrounding and/or underlying mat assembly 10. Further, the recesses 20 and/or other surfaces of mat holder 11 may be sloped to direct collection of the entrapped contaminants in the recessed areas 20 or to a collection area in mat holder 11.

Referring to FIG. 2B, edge 17 of mat insert 12 is shown in a generally central position between facing layer 14 and facing layer 16. This may be a preferred construction where facing layers 14 and 16 are both appearance layers, e.g., where mat insert 12 is reversible in mat holder 11. When facing layers 14 and 16 are of different configurations, e.g., facing layer 14 as shown in FIG. 2B includes a carpet-like layer 13 and facing layer 16 is a woven layer which may be of a grid like pattern, the user is provided with the advantage of being able to select a mat insert appearance surface from one of layer 13 and layer 16. The user may choose the carpet-like layer 13 to be outwardly facing in use conditions where minimal contaminants are anticipated, e.g., the user's shoes are relatively contaminant-free, or in clement weather. Alternatively, the user may choose the grid like pattern of facing layer 16 to be outwardly facing in inclement weather, when the user's shoes may be wet or muddy. As another option, facing layers 14 and 16 may be of the same configuration, providing an advantage of two appearance surface layers 13, such that the user may reverse the mat insert 12 if, for example, the surface layer 13 of one side becomes worn or damaged, thus extending the useable life and durability of mat insert 12. Additionally, it would be understood that mat insert 12 may be replaced in mat holder 11 by a replacement mat insert 12, for example, if the original equipment mat insert became damaged or worn, or if a mat insert with a different color, appearance layer, etc., was available as an accessory for user installation for various use conditions or user preference.

Figure 3A:
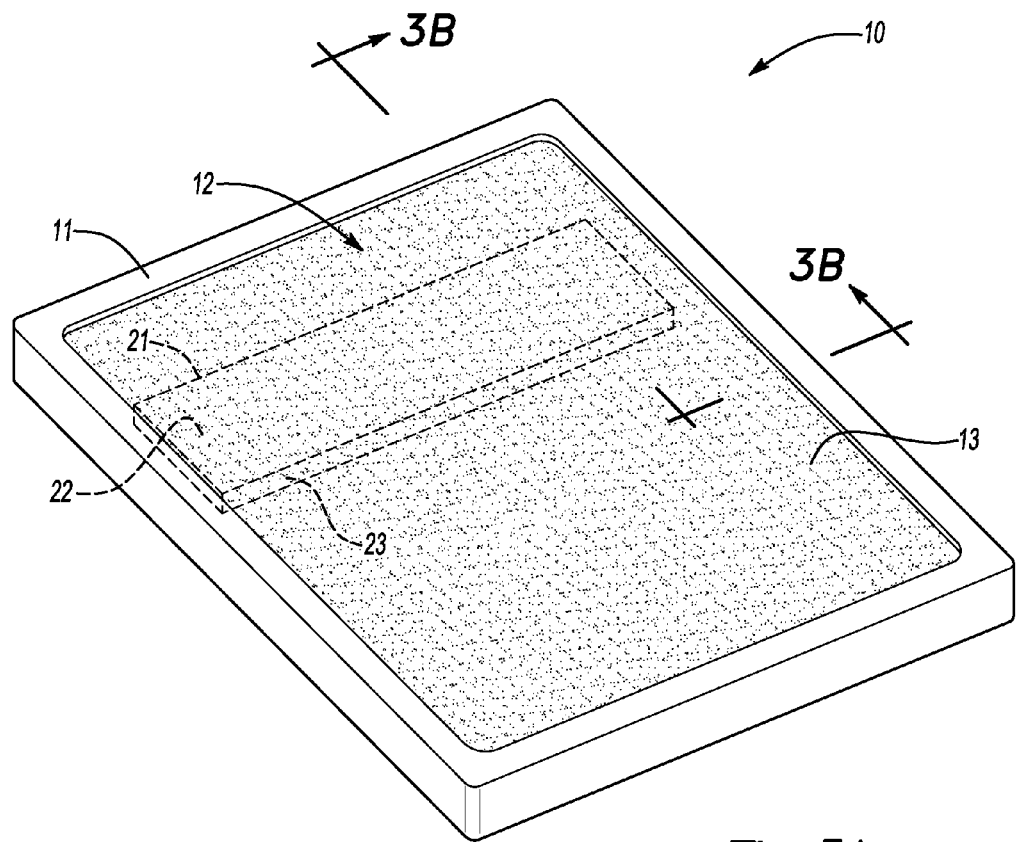
FIG. 3A is a schematic perspective view illustration of the mat assembly of FIG. 1 including a dirt removal panel.
Figure 3B:
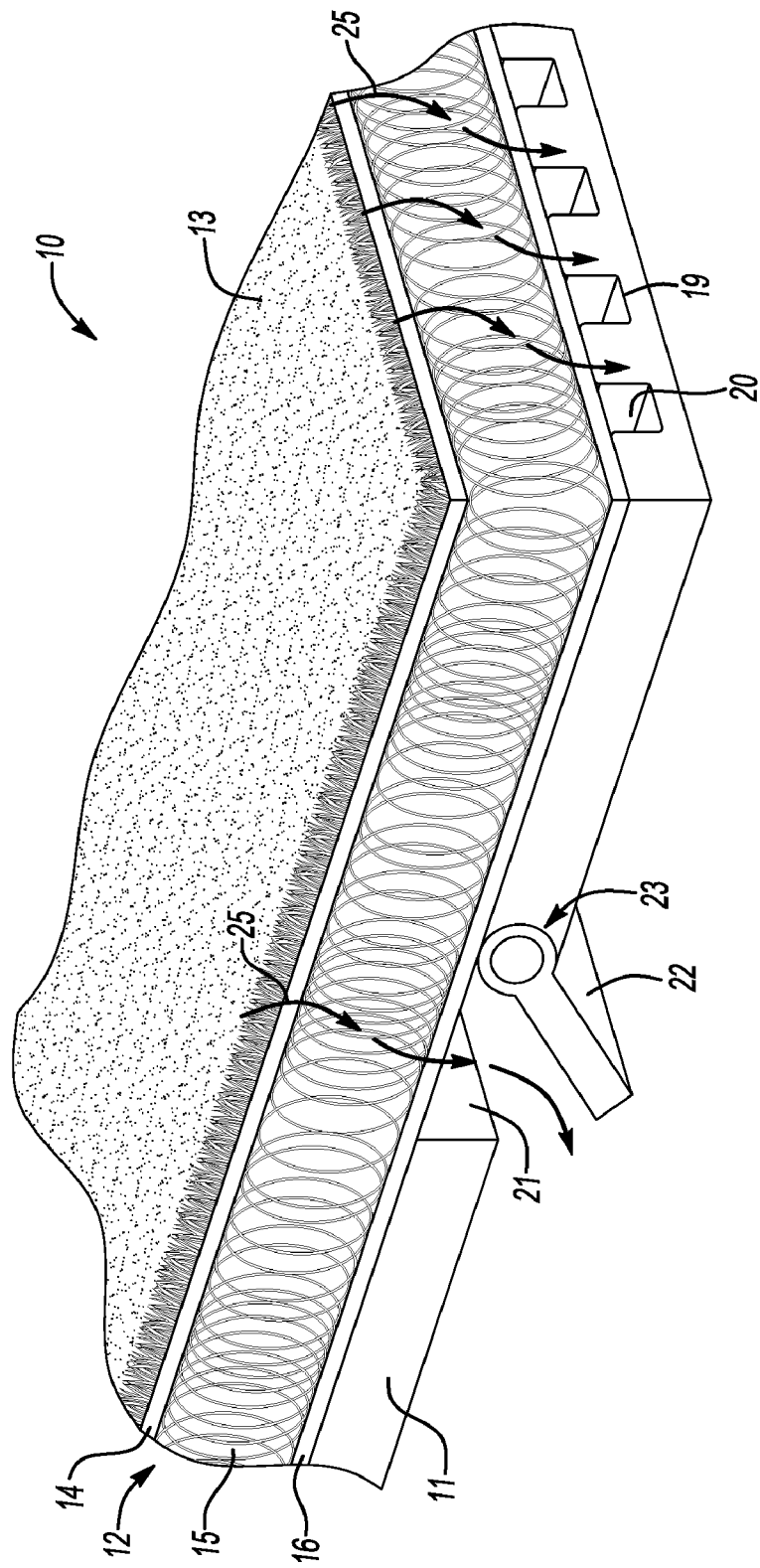
FIG. 3B is a partially cross-sectioned view of the mat assembly of FIG. 3A.

As shown in FIGS. 3A and 3B, the mat holder 11 may also include a panel, flap or door 22 which fits within an opening 21, through which entrapped contaminants may be removed from the mat assembly 10. Panel 22 may be hingedly attached to mat holder 11, as indicated at 23, or the panel 22 may be fully detachable and removable from mat holder 11. Panel 22 and opening 21 may be of any size and configuration sufficient to enable efficient removal of entrapped contaminants from the mat assembly 10. Further, entrapped contaminants may be removed from mat assembly 10 by dumping, draining, evacuating or vacuuming the contaminants from mat assembly 10, after either removing mat insert 12, opening or removing panel 22, or both removing mat insert 12 and opening panel 22. A vacuum attachment may, for example, be adapted to opening 21 to provide another method of removing entrapped contaminants from mat assembly 10.

As shown in FIG. 3B, mat holder 11 may include both a panel or door 22 and a plurality of recesses 20, shown in FIG. 3B as defined by channels or grooves 19 which are oriented perpendicular to hinge 23, which may be a living hinge. As contaminants permeate mat insert 12, through paths 25, the contaminants become entrapped and are collected in recesses 20 defined by channels 19. As discussed previously, recesses 20 increase capacity of the volume of contaminants which may be entrapped by mat holder 11. As shown in FIG. 3B, by orienting recesses 20 to terminate at opening 21, contaminants may be efficiently removed from mat assembly 10 by opening door 22 and draining or evacuating the contaminants through opening 21. As discussed previously, mat holder 11 may also be sloped or include sloped areas or sloped recesses to direct the collection of the entrapped contaminants to the panel 22 and/or opening 21, to assist efficient removal of the contaminants.

When used in a vehicle application, for example, in an automobile, sports utility vehicle, truck, golf or utility cart, boat, etc, mat holder 11 may be defined by an element of the vehicle. For example, mat holder 11 may be an aperture in a covering, such as in the vehicle carpeting, a liner or an insert for a floor, trunk, cargo area or bed of the vehicle, where the aperture may be configured to include one or more attaching features, such as a groove or slot in the face of the aperture, attaching clips, a ridge or ledge upon which the insert may rest, etc. Alternatively, mat holder 11 may be defined by a cavity or recessed area in the floor, trunk, cargo area and a bed of the vehicle, or mat holder 11 may be defined by a combination of an aperture and a cavity. The surface underlying mat insert 12 may include additional recesses or cavities 20 defined, for example, by slopes or channels or ridges 19, to collect contaminants which have permeated the mat insert 12. The underlying surface may be further configured such that the entrapped contaminants may be removed by draining, evacuating or vacuuming the contaminants through an opening 21 provided in the underlying surface. The opening 21 may include a door or panel 22, which may be removable or may be attached by a hinge 23, which may be a living hinge. Alternatively, the opening 21 may be a slot, a screened opening or other aperture through which contaminants may be evacuated or drained in a continuous manner. This latter condition may be advantageous, for example, where mat insert 12 is configured as a bed liner for a truck bed, and where the truck bed is configured as a mat holder 11 with attaching features 18 included in the truck bed. The truck bed surface may be configured with channels 19 which terminate into an opening 21 in the truck bed, which may be a slot. Contaminants from, for example, a payload or cargo in the truck bed, permeate the bed liner (mat insert) 12 and become entrapped and are collected in channels 19 of the truck bed (mat holder) 11, and are then drained or evacuated through an opening 21. A similar configuration could be provided in a vehicle trunk compartment, which would provide the convenience of a dirt-hiding and/or self-cleaning surface for the interior floor of the trunk.

While the best modes for carrying out the invention have been described in detail, those familiar with the art to which this invention relates will recognize various alternative designs and embodiments for practicing the invention within the scope of the appended claims.

The invention claimed is:

1. A mat assembly comprising:
   a mat holder; and
   a mat insert;
   wherein the mat insert includes a spacer fabric;
   wherein the spacer fabric includes a spacer layer and at least one facing layer;
   wherein the spacer fabric is configured such that contaminants migrate through the mat insert to the mat holder;
   wherein the mat insert and the mat holder are configured such that the mat insert can be operatively attached to the mat holder;
   wherein the mat holder is configured to include an attaching feature;
   wherein the attaching feature of the mat holder is one of a slot, a groove and a channel;
   wherein the mat insert is configured to include a corresponding feature;
   wherein the corresponding feature of the mat insert is configured for insertion into one of a slot, a groove and a channel; and
   wherein the mat insert is operatively attached to the mat holder by contact of the attaching feature and the corresponding feature.

2. The mat assembly of claim 1, wherein the mat holder is configured to entrap contaminants which migrate through the mat insert.

3. The mat assembly of claim 1, wherein the mat insert and the mat holder are further configured such that the mat insert including the spacer fabric is detachable from the mat holder and reattachable to the mat holder after removal of the contaminants.

4. The mat assembly of claim 1, wherein at least one of the spacer layer and the at least one facing layer includes an appearance layer; and
   wherein the mat insert is configured such that the appearance layer is outwardly facing when the mat insert is operatively attached to the mat holder.

5. The mat assembly of claim 1, wherein the spacer fabric defines a plurality of openings configured such that the size of each of the plurality of openings varies relative to a force exerted on the spacer fabric.

6. The mat assembly of claim 1,
   wherein the spacer fabric is a 3D knitted distance fabric including a first facing layer, a second facing layer and the spacer layer;
   wherein the spacer layer is connected to the first facing layer and the second facing layer by knitting.

7. The mat assembly of claim 1,
   wherein the spacer fabric configured as a knitted structure defining a plurality of open spaces; and
   wherein the contaminants migrate through the mat insert via the knitted plurality of open spaces.

8. The mat assembly of claim 1, wherein at least an edge portion of a perimeter of the mat insert is reinforced by one of joining, knitting, sewing, seaming, fusing, crimping, bonding and binding together edge portions of the layers of the spacer fabric for at least a portion of the perimeter.

9. The mat assembly of claim 2, wherein the mat holder includes at least one recess or slope to collect the contaminants which have been entrapped by the mat holder.

10. The mat assembly of claim 1, wherein two of the spacer layer and the at least one facing layer are configured as an appearance layer; and
    wherein one or the other of the two appearance layers is outwardly facing when the mat insert is operatively attached to the mat holder such that the mat insert is configured to be reversible.

11. The mat assembly of claim 1, wherein the mat holder includes an opening through which contaminants entrapped by the mat holder may be removed from the mat assembly without detaching the mat insert from the mat holder.

12. A mat assembly configured for use with a vehicle floor, comprising:
    a mat holder configured to be matable with the vehicle floor; and
    a mat insert;
    wherein the mat insert includes a spacer fabric defining a plurality of open spaces;
    wherein the mat insert is configured to migrate contaminants via the plurality of open spaces to the mat holder;
    wherein the mat insert and the mat holder are configured such that the mat insert can be operatively attached to the mat holder;
    wherein the mat holder is configured to entrap contaminants which have migrated through the mat insert;
    wherein the mat holder includes a panel through which entrapped contaminants may be removed from the mat assembly without detaching the mat insert; and
    wherein the panel is configured to be one of hingedly attached to the mat holder and detachable from the mat holder to allow removal of entrapped contaminants from the mat assembly.

13. The mat assembly of claim 12,
    wherein the mat holder is configured to include an attaching feature;
    wherein the mat insert is configured to include a corresponding feature; and
    wherein the mat insert is operatively attached to the mat holder by contact of the attaching feature and the corresponding feature, such that the mat insert is detachable from and reattachable to the mat holder after removal of contaminants.

14. The mat assembly of claim 12, wherein the spacer fabric is configured as a 3D knit fabric defining the plurality of open spaces; and wherein contaminants migrate through the mat insert via the plurality of open spaces.

15. The mat assembly of claim 12,
    wherein the spacer fabric includes a facing layer including a first plurality of open spaces defining a facing layer permeability, and a spacer layer including a plurality of second open spaces defining a spacer layer permeability; and
    wherein the spacer layer permeability is greater than the facing layer permeability to migrate contaminants via the facing layer and the spacer layer to the mat holder.

16. The mat assembly of claim 12, wherein the mat holder is defined by a floor of the vehicle.

17. The mat assembly of claim 16,
    wherein a vehicle surface underlying the mat insert includes at least one cavity or sloped surface to collect the contaminants which have migrated through the mat insert.

* * * * *